United States Patent [19]

Kuemmerer et al.

[11] 4,341,329
[45] Jul. 27, 1982

[54] DISPENSING APPARATUS FOR ASEPTIC MEASUREMENT AND FILLING OF A FLUID PRODUCT

[75] Inventors: Helmut Kuemmerer, Nellmersbach; Theo Moser, Steinenberg; Adolf Genstorfer, Althuette, all of Fed. Rep. of Germany

[73] Assignee: Robert Bosch GmbH, Stuttgart, Fed. Rep. of Germany

[21] Appl. No.: 149,227

[22] Filed: May 13, 1980

[30] Foreign Application Priority Data

May 25, 1979 [DE] Fed. Rep. of Germany ....... 2921236

[51] Int. Cl.³ .............................................. G01F 11/02
[52] U.S. Cl. .................................. 222/275; 222/380; 222/531; 222/559; 141/235; 417/518
[58] Field of Search ............... 222/275, 276, 372, 380, 222/559, 531; 141/146, 235; 417/516, 518

[56] References Cited

U.S. PATENT DOCUMENTS

| 846,169 | 3/1907 | Valerius | 141/235 X |
| 2,761,606 | 9/1956 | Pahl et al. | 141/146 X |
| 3,040,787 | 6/1962 | Knoll | 141/146 X |
| 3,168,225 | 2/1965 | Miller et al. | 141/146 X |
| 3,850,345 | 11/1974 | Merritt | 141/146 X |

FOREIGN PATENT DOCUMENTS 2321205 11/1974 Fed. Rep. of Germany ...... 222/372

*Primary Examiner*—Robert J. Spar
*Assistant Examiner*—Frederick R. Handren
*Attorney, Agent, or Firm*—Edwin E. Greigg

[57] ABSTRACT

A dispensing apparatus for aseptic measurement and filling of a fluid product is proposed, which, particularly as a result of the simple embodiment of a control slide valve, is especially suitable for the development of a multiple dispensing apparatus. A groove-like recess provided in the control slide serves both to connect the fluid reservoir chamber with the dispensing chamber and to connect the dispensing chamber with the particular container to be filled.

4 Claims, 4 Drawing Figures

DISPENSING APPARATUS FOR ASEPTIC MEASUREMENT AND FILLING OF A FLUID PRODUCT

BACKGROUND OF THE INVENTION

Various dispensing systems are known for measuring out fluids and filling containers with them. The measurement of the particular quantity of fluid to be filled at one time is effected, for instance, by a piston which can reciprocate within a dispensing chamber. Either automatically functioning ball or cone valves or automatically controlled valves, for instance in the form of a slide which is rotatable or movable up and down, are then associated with this piston. While ball or cone valves which function automatically are preferably used to fill containers with homogeneous fluids, it is necessary to use automatically moved control valves for filling containers with fluids which include solid or semisolid components; an example of such a fluid would be yogurt with strawberries, cherries, pieces of pineapple or the like. If a multiplicity of containers disposed relatively closely adjacent to and in sequence with one another is to be filled simultaneously, as is the case, for instance, with containers created by deep-drawing or the like from one strip and still connected to one another, then the filling devices must likewise be disposed very closely adjacent to and in sequence with one another. In these cases, it has proved to be efficient to use a dispensing apparatus in which the axes of the dispensing piston and of the control slide extend parallel and vertically relative to one another.

An apparatus of this kind, in which the axes of the dispensing piston and of the control slide extend vertically and parallel to one another, has become known from German Auslegeschrift No. 23 21 205. However, because of the particular form of the control slide of this known apparatus, the structure is of relatively large volume, so that this apparatus does not permit the close disposition adjacent to and in sequence with one another of a plurality of units comprising dispensing pistons and control slides. Furthermore, because of the complex embodiment of the control slide, there is an equally complex control chamber. The expense of manufacturing both elements is accordingly relatively high.

From U.S. Pat. No. 1,946,025, a further dispensing apparatus has become known, which has a control slide of simple structure. However, a relatively large recess is provided in this control slide for the purpose of connecting the fluid reservoir chamber to the dispensing chamber. Because of the very large recess, the control slide is severely weakened. A further disadvantage is that for filling the dispensed fluid into the particular container the control slide must be moved all the way to the top, which firstly requires very large control movements and secondly enables merely the simple outflow of the fluid into the container to be filled at that time.

A dispensing apparatus is sought which is distinguished by a very simple structure and in which, furthermore, very close disposition of a multiplicity of filling stations adjacent to and in sequence with one another is possible.

OBJECT AND SUMMARY OF THE INVENTION

The dispensing apparatus according to the invention has the advantage over the prior art that conveying the fluid both from the fluid reservoir chamber into the dispensing chamber and from the dispensing chamber into the container to be filled is effected with one and the same groove-like recess provided in the control slide. A control slide embodiment of this kind permits not only straight-line fluid guidance but also short control travel paths for the slide. A further advantage is the long guidance of the control slide, so that there is only a small amount of surface-area pressure and as a result only limited wear occurs. The very limited depth of the groove-like recess in the control slide enables a rigid embodiment of the control slide. A further advantage results from the possibility of vertical adjustment of the control slide in that an individualized outflow embodiment is thus provided, which can be adapted to the particular medium being filled.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
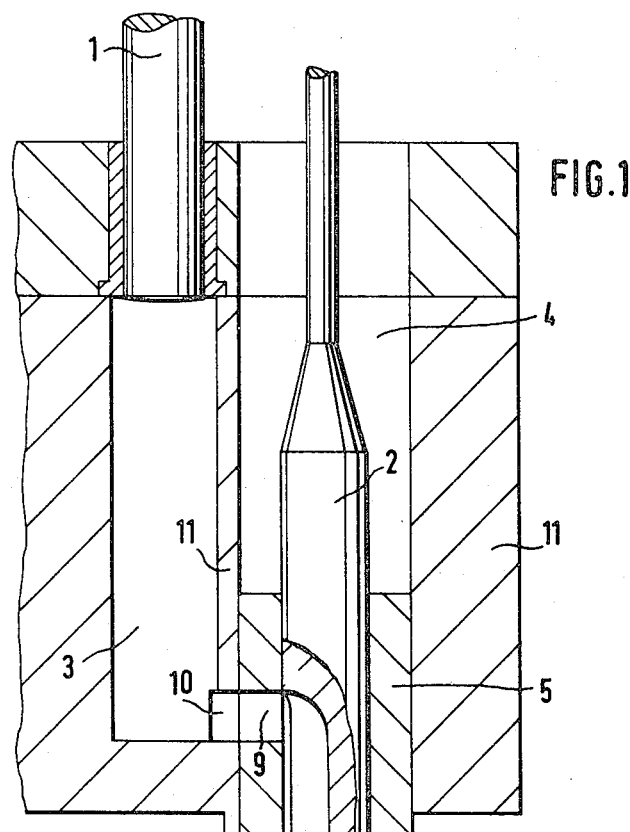
FIG. 1 is a longitudinal sectional view taken through a unit comprising a dispensing piston and a control slide.
Figure 2:
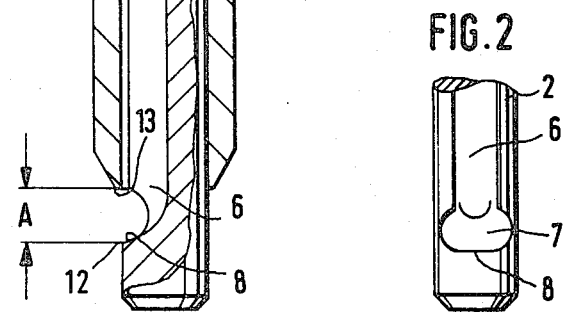
FIG. 2 is a fragmentary front view of the groove-like recess of the control slide in the outflow region.

As may be seen in FIG. 1, the dispensing apparatus according to the invention substantially comprises a dispensing piston 1 and a control slide 2, whose axes extend parallel and vertically relative to one another. Both the piston 1 and the control slide 2 are appropriately housed and portions of said housing therefor are indicated at 11. The dispensing piston 1 is embodied as a positive-displacement piston and it moves within a dispensing chamber 3. Beside the dispensing chamber 3, a chamber 4 is provided which represents one portion of the fluid reservoir chamber. This chamber 4 is realized as a bore, in the lower portion of which a sheath or tubular element 5 is located. The sheath 5 serves to guide the control slide 2. This control slide 2 has a groove-like recess or transport means 6, the length of which is dimensioned such that, depending upon the position of the control slide 2, there is communication either between the fluid supply chamber 4 and the dispensing chamber 3 or between the dispensing chamber 3 and a container to be filled (not shown). As FIG. 2 shows, the longitudinal groove-like recess 6 is adjoined in the lower portion by a transverse groove-like recess or mouth 7. The lower limiting face 8 of this transverse groove-like recess 7 is disposed in an inclined manner, as may be seen particularly well in FIG. 1. FIG. 1 furthermore shows that the sheath 5 guiding the control slide 2 has an aperture 9, which corresponds with an opening 10 in the wall 11 of the dispensing chamber 3. Both the dispensing piston 1 and the control slide 2 are controlled from above by means which are not shown. By means of the vertical adjustment of the control slide 2, the discharge area A between the rim 12, the lower lip or face 8 and the rim 13 of the sheath 5 can be varied and thus adapted to the particular properties of the fluid product to be dispensed.

Figure 3:
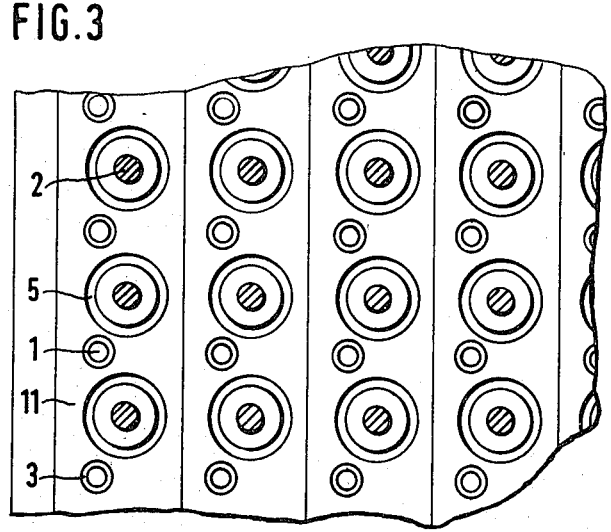
FIG. 3 shows in a plan view the disposition adjacent to and in sequence with one another of a multiplicity of units comprising dispensing pistons and control slides.

FIG. 3 shows generally in a plan view a detail of a multiple pump made up of a multiplicity of units of the dispensing apparatus according to the invention. As a result of the simple embodiment of the control slide 2, it is possible to dispose the individual filling stations very closely adjacent to and in sequence with one another, so that a multiplicity of containers can be filled simultaneously with a relatively small grid dimension.

Figure 4:
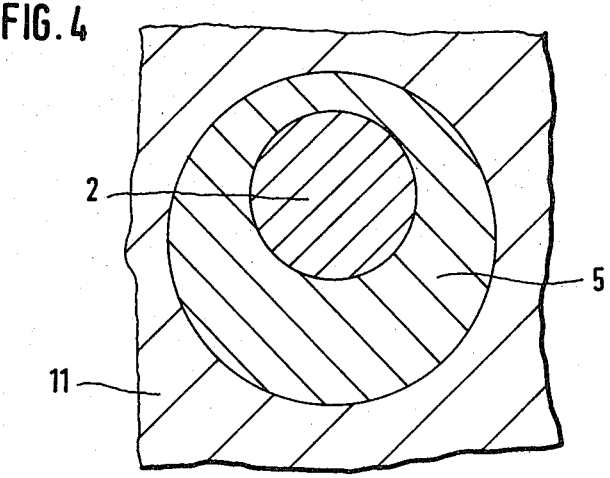
FIG. 4 shows a view on line 4—4 of FIG. 1 in which an eccentric positioning of the sheath guides the control slide and is intended for adjusting the control slide to various grid dimensions.

An adaptation to particular grid dimensions is provided by the eccentric embodiment and arrangement of the sheath 5 shown in FIG. 4. As a result of the eccentric body portion in this embodiment and an arrangement of this kind, extremely close spacing can be attained at least for two rows of receptacles at a time.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A dispensing apparatus for aseptic measurement and filling of a container with a fluid product which may include solid components, including a housing with first and second side-by-side vertically disposed parallel bores, said first bore comprising a dispensing chamber for said fluid product and said second bore including a supply chamber, an opening between said dispensing chamber and said supply chamber, a tubular element supported in said supply chamber, a control slide slidably supported in said tubular element for reciprocating movement between an uppermost position and a lowermost position, a reciprocable piston in said bore of said dispensing chamber, said control slide further including a longitudinally extending groove-like recess, an aperture in said tubular element at the same elevation and in alignment with said opening between said dispensing chamber and said supply chamber extending to said groove-like recess, said groove-like recess disposed in a sidewall of said control slide and cooperating with said tubular element to define a flow passsage so that when said control slide is in its uppermost position, a fluid connection is made between said supply chamber and said dispensing chamber and when said control slide is in its lowermost position, said groove-like recess connects said dispensing chamber with a container positioned to receive fluid conducted from said dispensing chamber by way of said flow passage.

2. A dispensing apparatus as defined by claim 1, characterized in that said tubular element for said control slide is insertable into said supply chamber from below.

3. A dispensing apparatus as defined by claim 2, characterized in that said control slide is off the center line of said tubular element.

4. A dispensing apparatus as defined by claim 1, characterized in that said housing is provided with a multiplicity of units each comprising one dispensing piston and one slidable control slide disposed adjacent to and in sequence with one another.

* * * * *